C. A. PALMGREN.
STAPLING DEVICE.
APPLICATION FILED APR. 22, 1912.

1,067,541.

Patented July 15, 1913.

3 SHEETS—SHEET 1.

Witnesses:

Inventor:
Carl A. Palmgren,
By Dyrenforth, Lee, Chritton & Wiles,
Att'ys.

C. A. PALMGREN.
STAPLING DEVICE.
APPLICATION FILED APR. 22, 1912.

1,067,541.

Patented July 15, 1913.

3 SHEETS—SHEET 2.

Witnesses:

Inventor:
Carl A. Palmgren,
By Dyrenforth, Lee, Chritton & Wiles,
Att'ys.

C. A. PALMGREN.
STAPLING DEVICE.
APPLICATION FILED APR. 22, 1912.
1,067,541.
Patented July 15, 1913.
3 SHEETS—SHEET 3.
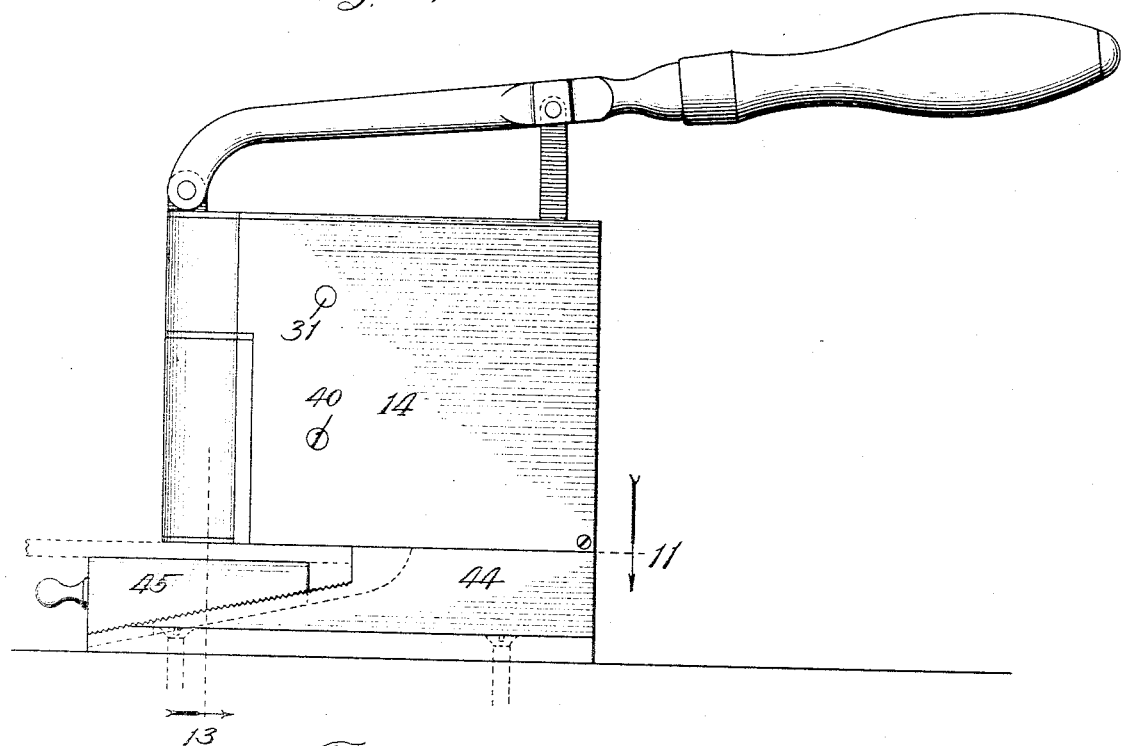
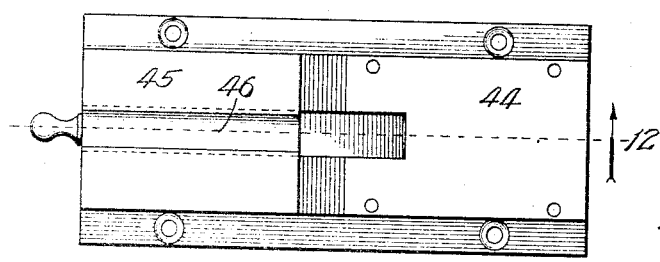
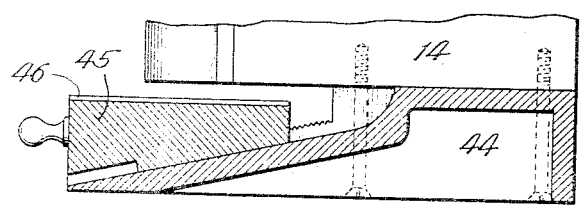
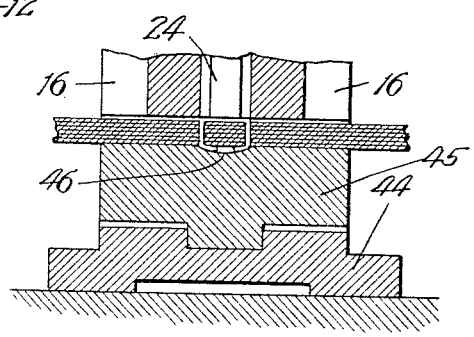
Inventor:
Carl A. Palmgren,
By Dyrenforth, Lee, Chritton and Wiles,
Attys.

UNITED STATES PATENT OFFICE.

CARL A. PALMGREN, OF CHICAGO, ILLINOIS.

STAPLING DEVICE.

1,067,541.  Specification of Letters Patent.  Patented July 15, 1913.

Application filed April 22, 1912. Serial No. 692,318.

*To all whom it may concern:*

Be it known that I, CARL A. PALMGREN, a citizen of the United States, residing at Chicago, in the county of Cook and State of Illinois, have invented a new and useful Improvement in Stapling Devices, of which the following is a specification.

My invention relates to certain new and useful improvements in stapling devices, and is fully described and explained in the specification and shown in the accompanying drawings in which:—

Figure 1:
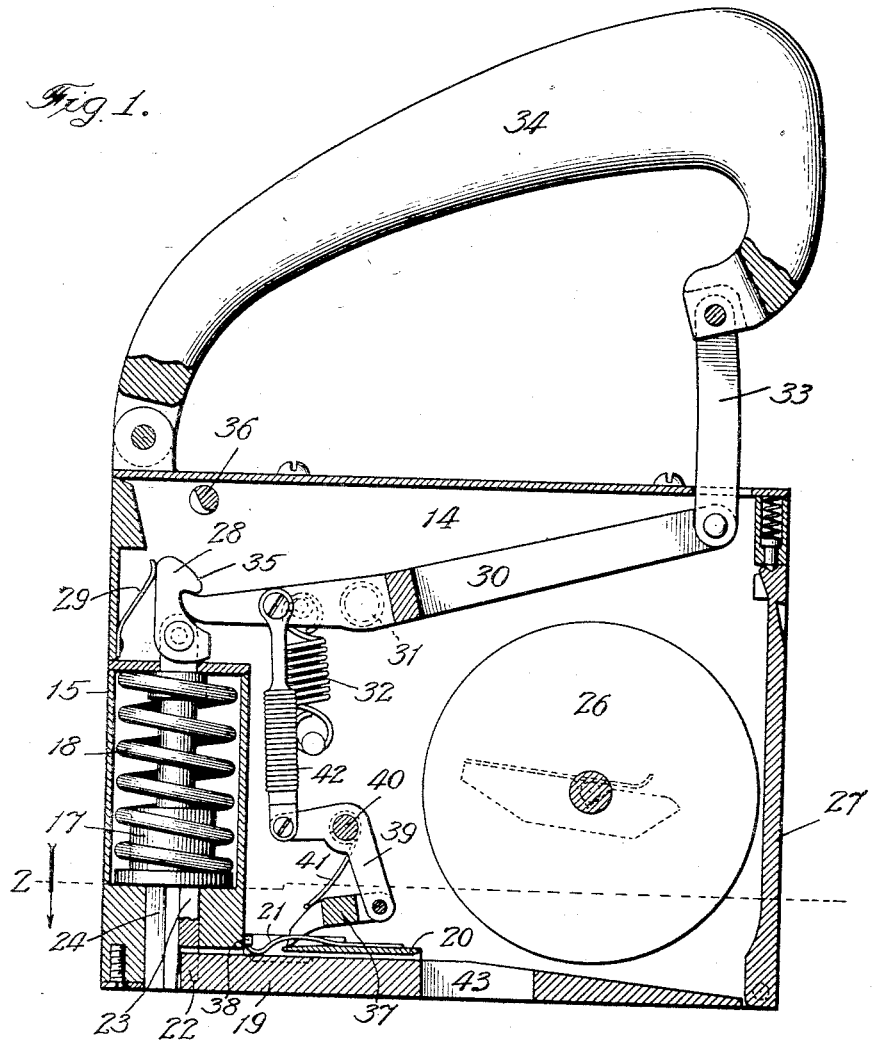
Figure 2:
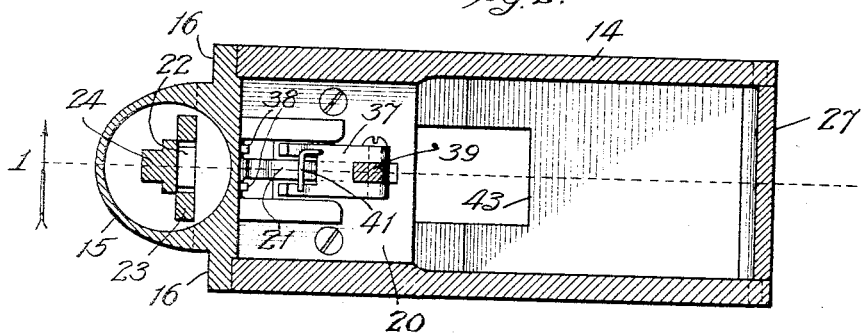
Figure 3:
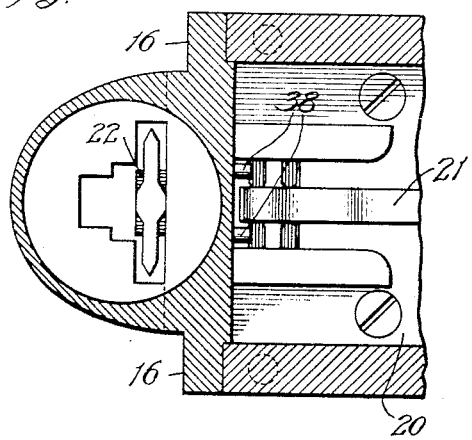
Figure 6:
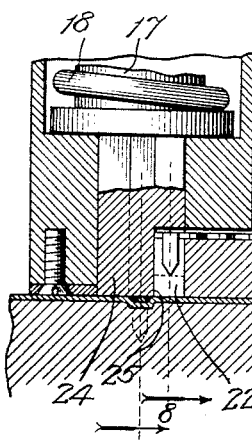
Figure 4:
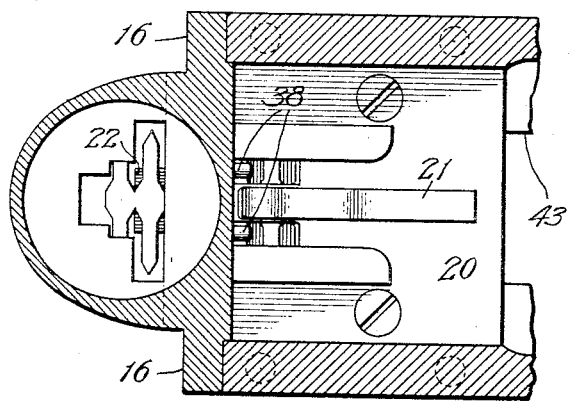
Figure 7:
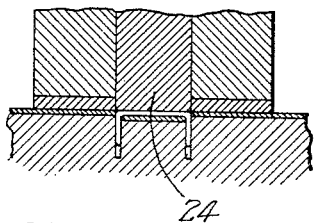
Figure 8:
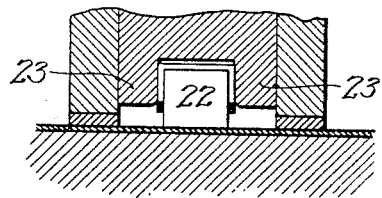
Figure 5:
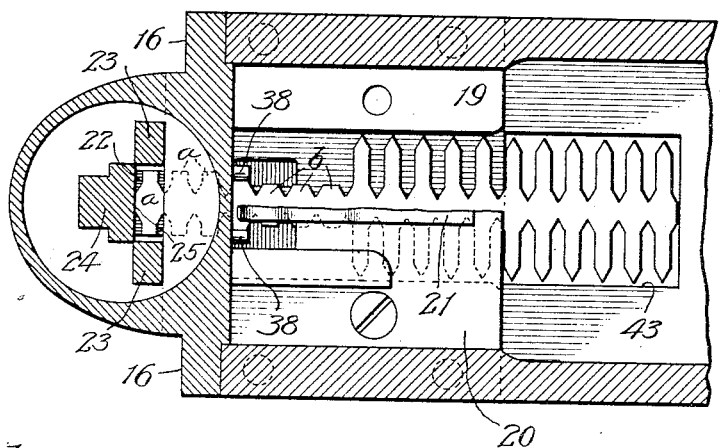
Figure 9:
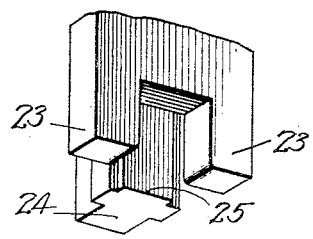

Figure 1 is a central longitudinal section on the line 1 of Fig. 2; Fig. 2 is a transverse section on the line 2 of Fig. 1; Fig. 3 is a view on a larger scale of the mechanism shown in the lefthand part of Fig. 2, but with the hammer raised; Fig. 4 is a similar view with the material fed forward one step; Fig. 5 is a similar view showing the manner in which the feeding stops at the end of a strip of material; Fig. 6 is a central longitudinal section through the parts shown in Fig. 4 but taken after the hammer has descended; Fig. 7 is a section on the line 7 of Fig. 6; Fig. 8 is a section on the line 8 of Fig. 6; Fig. 9 is a perspective view of the bottom part of the hammer; Fig. 10 is an elevation of the mechanism with an additional attachment for enabling it to be used in handling paper; Fig. 11 is a section on the line 11 of Fig. 10; Fig. 12 is a section on the line 12 of Fig. 11, and Fig. 13 is a section on the line 13 of Fig. 10.

Referring to the drawings, 14 is a case at one end of which is mounted a hollow barrel 15, preferably made with projecting flanges 16 which are secured to the sides of the case 14 whereby the barrel itself forms one lower end-portion of the entire casing of the structure. Vertically reciprocable in the barrel is a plunger 17 pressed down by a spring 18, the lower end of said plunger carrying the hammer which is guided in a properly perforated plate closing the bottom of the barrel. Just back of the point of descent of the hammer, that is to the right, as viewed in the drawings, is an anvil plate 19 surmounted by a guide plate 20 between which and the anvil the staple-forming material is fed, the end of the staple-forming material being held down by a flat spring 21 carried by the guide plate 20. At the end of the anvil plate is a tooth 22 over which the legs of the staples are bent, as shown in Fig. 2, and by the forward upper corner of which, in coöperation with the hammer, they are cut off.

The hammer construction can probably best be understood from the perspective view thereof, shown in Fig. 9, from which it will be seen that at its lower end are two bending legs 23 sufficiently separated to straddle the tooth 22 and to leave space in addition for the thickness of the staple-material (Fig. 8). In addition to these bending legs there is a driving leg 24 which, when the hammer is at its lowest point as shown in Fig. 1, comes down flush with the bottom surface of the riveting apparatus and which drives the staple as shown in Fig. 7. This driving leg comes so close to the forward upper corner of the tooth 22 of the anvil that its lower rear edge 25 in coöperation with said corner of the tooth 22 shears off the staples from the strip.

The staple-forming strips are coiled on a reel 26 carried in the rear of the case, which may be removed or replaced through a door 27. The configuration of the material is readily perceived from the drawings. There is a central strip nearly severed at intervals and from which project on opposite sides pointed tip-forming parts. This material, as already indicated is fed under the guide plate 20 by mechanism which will presently be described in detail. When it reaches the position shown in Fig. 3 where one pair of tips, or, the material for one staple, is over the tooth 22 of the anvil, the hammer descends bending the tips of the staple downward over the tooth as shown in Fig. 8. The hammer is then raised by mechanism which will hereafter be described and the strip is simultaneously fed forward so as to bring the staple with its tips bent down one step forward, that is into the position shown in Fig. 4, and to bring another unformed staple over the tooth at the end of the anvil. The next descent of the hammer will sever the bent staple from the strip and drive it into the material beneath the hammer as shown in Fig. 7, while the same descent will bend the legs or tips of the following staple so that at each descent of the hammer after the first staple has been formed in a strip, the terminal staple will be cut off and driven and the next to the terminal staple will have its legs bent down, all as shown in Fig. 6.

It now remains to describe the hammer operating mechanism and the feeding mechanism. The plunger 17 has at its upper end a hook 28 normally pressed backward by a spring 29 so as to engage with the tip of a lever 30, pivoted at 31, having its forward end normally held down and its rear end normally held up by a spring 32. The rear end of the lever 30 is connected by a link 33 with a handle 34 by which the entire device, in the form shown in Figs. 1 to 9 inclusive, may be picked up and carried around, through the medium of which the mechanism is also operated. The hook 28 is provided with a cam-surface 35 adapted to be engaged by a pin 36 to disengage the hook from the end of the lever 30. Thus when the stapling-device is picked up by the handle 34 and pressed against a surface the handle is crowded toward the case and the forward-end of the lever 30 is thereby elevated, thus compressing the hammer-driving spring 18. When the hammer has reached the upper limit of its movement the cam-surface 35 on the hook 28 engages the pin 36, so as to release the hammer from the lever and the spring 18 drives the hammer down with great force, in the normal operation thus bending down the tips of one staple and severing and driving the other.

37 is a feed-pawl shaped to engage the projecting unbent tips at the sides of the staple-forming material. The pawl straddles the spring 21, being bifurcated for the purpose and engages the staple-forming material where the same is exposed by passing under a notch cut in the forward part of the guide-plate 20. The pawl-ends at the extreme limit of their forward movement engage limit-pins 38 carried by the back of the barrel 15. The feed-pawl 37 is reciprocated back and forth once for each stroke of the hammer by a bell-crank lever 39 pivoted on a pin 40 in the case, the forward end of the pawl being held down by a spring 41 which receives its support also from the pin 40. The forward end of the bell-crank lever 39 is connected by a yielding link 42 with the forward end of the main lever 30.
As a result of this construction each time the operating handle 34 is pressed down and the hammer rises the pawl moves forward until it strikes the limit pins 38, feeding the material in the proper manner and to the proper distance. The handle may move somewhat farther, the extra movement being taken up by the elasticity of the link 42. When the handle completes its downward movement the hammer operation occurs as already specified.

In a device of the character here shown, and where no special provision is made, it would be impossible to feed the staple-forming strip to its end, and, owing to the fact that the last staple to reach the tooth of the anvil had had its tips bent down, it would be impossible to draw out the end of the strip. Therefore, each length of staple-forming material is finished at its end as shown in Fig. 5. A certain number of the staple portions lettered $a$ are cut off at the tips to just the width of the tooth 22 at the end of the anvil, so that their ends will not be bent down by the hammer. The ends of these staple-forming parts are, however, left long enough to be engaged by the feeding-pawl and enough of these parts $a$ are provided that the forward one will lie on the anvil tooth when the last one has been acted upon by the pawl. Behind these parts $a$ are other staple-forming members $b$ whose tips are cut off still shorter so as to clear the pawl entirely, so that when the last part $a$ has gone forward under the influence of the pawl the feeding of the blank will stop. Thereupon the waste-end of the strip can be withdrawn either through the door or through a perforation 43 provided for the purpose in the bottom of the case.

The device as so far described is adapted to be used, as stated, in the hand of the operator and it will form and drive a staple into any surface against which the device is pressed. Thus it can be operated with one hand leaving the other hand free.

The principal use for which the mechanism is now thought to be desirable is for fastening shipping tags on boxes or fastening cards on the sides of railway cars and for similar analogous purposes. In work of this character the operator should have one hand free to adjust the card in the proper position and it is most beneficial if the other hand can do all the stapling work. Practically this work is done at the present time with a hammer and tacks and particularly in working about freight cars in cold weather the work is of a very arduous nature. The present device can be charged with sufficient staple-forming material wound up on the reel to last for a day, and the material can readily be furnished wound on reels of a cheap character which can be inserted in the proper position, the old and empty reel being thrown away when the contents is exhausted. In this way this class of work can be made very much easier and it can be performed very much more rapidly than in accordance with common practice. However, the use of the portable device for this purpose, while the principal one for which the mechanism is designed, is not the only one to which it can be applied, and in Figs. 10 to 13 an attachment is shown by which the mechanism can be used for stapling paper. In order to secure a greater leverage a long handle is adopted in this form. This is of course convenient but not of mechanical importance. A base 44 is secured to the bottom of the stapling mechanism in an obvious manner and is cut away at the forward end under the point of descent of the hammer. A block 45 beveled to conform to the bevel of the cut-away portion is inserted beneath the barrel. This block 45 has a shallow rounded groove 46 in its upper surface to turn in the ends of the staples, as shown in Fig. 13. The engaging surfaces of the base 44 and the block 45 are made with teeth so that the block is held firmly in position wherever placed. In practice a bunch of papers is put in the space between the block 45 and the bottom of the stapling device proper, the block 45 is pushed up as tight as desired and the stapling-mechanism is operated, so that the staple is driven through the bunch of papers and has its ends turned in as shown in Fig. 13.

I am aware that considerable variation is possible in the details of the present construction and I therefore do not intend to limit myself thereto, except as pointed out in the following claims, in which it is my intention to claim all the novelty inherent in the construction described as broadly as is permitted by the state of the art.

I claim as new and desire to secure by Letters Patent:

1. In combination, a hammer having a staple-driving part and furcations behind said part to engage and bend the tips of a section of staple forming material into staple form, a hammer-driving spring, an operating handle, means operated by movement of the handle for retracting the hammer, means to release the hammer from the retracting means, and an anvil having a tooth over which the furcations of the hammer pass to bend the tips of a section of staple forming material into staple form and having a part between which and the driving-part of the hammer the staple is severed.

2. In combination, a hammer having a staple-driving part and furcations behind said part to engage and bend the tips of a section of staple forming material into staple form, a hammer-driving spring, an operating handle, means operated by a continuous movement of the handle in one direction for retracting the hammer, means for releasing the hammer from the actuating means, and an anvil having a tooth over which the furcations of the hammer pass to bend the tips of a section of staple forming material into staple form, and having a part between which and the driving part of the hammer the staples are severed.

3. In combination, a hammer having a staple-driving part and furcations behind said part to engage and bend the tips of a section of staple forming material into staple form, a hammer-driving spring, an operating handle, means operated by movement of the handle for retracting the hammer, means to release the hammer from the retracting means, an anvil having a tooth over which the furcations of the hammer pass to bend the tips of a staple and having a part between which and the driving part of the hammer the section of staple forming material is severed, and a pawl operated as the hammer rises to feed forward the staple-forming material.

4. In combination, a hammer having a staple-driving part and furcations behind said part to engage and bend the tips of a section of staple forming material into staple form, a hammer-driving spring, an operating handle, means operated by movement of the handle for retracting the hammer, means to release the hammer from the retracting means, an anvil having a tooth over which the furcations of the hammer pass to bend the tips of a section of staple forming material into staple form and having a part between which and the driving-part of the hammer the staple is severed, and a pawl operated with a yielding pressure as the hammer rises to feed forward the staple-forming material.

5. In combination, a hammer having a staple-driving part and furcations behind said part to engage and bend the tips of a section of staple forming material into staple form, a hammer-driving spring, an operating handle, means operated by movement of the handle for retracting the hammer, means to release the hammer from the retracting means, an anvil having a tooth over which the furcations of the hammer pass to bend the tips of a section of staple forming material into staple form and having a part between which and the driving-part of the hammer the staple is severed, a pawl operated as the hammer rises to feed forward the staple-forming material, and a spool for holding staple-forming material and guiding means to direct the material to the feeding pawl.

6. In combination, a spring-pressed staple-forming and driving hammer, an anvil coöperating therewith, an operating handle, a lever operated by the handle, a hook on the hammer to engage the lever, means for disengaging the hook, a feeding pawl and means of connection between the lever and the feeding pawl including an elastic link, for the purpose set forth.

7. As an attachment for a stapling-device, a base having a cutaway portion to form an incline at its front end, a block having a groove for turning the ends of the driven staple and an inclined lower surface arranged to travel on the incline of the base, whereby said block may be adjusted to different heights to adjust the same to various thicknesses of material to be stapled resting thereon.

8. As an attachment for a stapling-device, a base having a cutaway portion to form an incline at its front end, a block having a groove for turning the ends of the driven staple and an inclined lower surface arranged to travel on the incline of the base, whereby said block may be adjusted to different heights to adjust the same to various thicknesses of material to be stapled resting thereon, and means to fix the position of the block at various heights.

9. As an attachment for a stapling device, a block having a groove for turning the ends of the driven staple, a base, the block and base meeting on an inclined plane, and engaging notches on the block and base to fix the position of the block.

In testimony whereof I have hereunto set my hand.

CARL A. PALMGREN.

In presence of two subscribing witnesses:
L. HEISLAR,
R. SCHAEFER.